US009411198B2

(12) United States Patent
Lim et al.

(10) Patent No.: US 9,411,198 B2
(45) Date of Patent: Aug. 9, 2016

(54) LIQUID CRYSTAL DISPLAY

(71) Applicant: SAMSUNG DISPLAY CO., LTD., Yongin, Gyeonggi-Do (KR)

(72) Inventors: Tae Woo Lim, Hwaseong-si (KR); Jong Seong Kim, Seoul (KR); Kyung Tae Chae, Hwaseong-si (KR)

(73) Assignee: SAMSUNG DISPLAY CO., LTD., Yongin, Gyeonggi-Do (KR)

(*) Notice: Subject to any disclaimer, the term of this patent is extended or adjusted under 35 U.S.C. 154(b) by 33 days.

(21) Appl. No.: 14/213,490

(22) Filed: Mar. 14, 2014

(65) Prior Publication Data
US 2014/0293193 A1 Oct. 2, 2014

(30) Foreign Application Priority Data

Mar. 29, 2013 (KR) .................... 10-2013-0034892

(51) Int. Cl.
G02F 1/1333 (2006.01)
G02F 1/1339 (2006.01)
G02F 1/1341 (2006.01)
(52) U.S. Cl.
CPC ........ G02F 1/1341 (2013.01); G02F 1/133377 (2013.01)
(58) Field of Classification Search
CPC G02F 1/133377; G02F 1/1341; G02F 1/1334
See application file for complete search history.

(56) References Cited

U.S. PATENT DOCUMENTS

| 5,469,280 | A | * | 11/1995 | Jang | G02F 1/1347 349/138 |
| 2001/0006409 | A1 | * | 7/2001 | Lee | G02F 1/134363 349/156 |
| 2010/0231843 | A1 | * | 9/2010 | Tadaki | G02F 1/133377 349/156 |
| 2011/0032469 | A1 | * | 2/2011 | Lee | G02F 1/133377 349/187 |
| 2013/0335664 | A1 | * | 12/2013 | Shim | G02F 1/1339 349/43 |
| 2014/0152948 | A1 | * | 6/2014 | Chae | G02F 1/133377 349/110 |
| 2014/0267966 | A1 | * | 9/2014 | Won | G02F 1/133377 349/42 |
| 2014/0267984 | A1 | * | 9/2014 | Lim | G02F 1/133377 349/86 |
| 2014/0268000 | A1 | * | 9/2014 | Lim | G02F 1/1339 349/153 |
| 2015/0049286 | A1 | * | 2/2015 | Kim | G02F 1/133377 349/110 |

* cited by examiner

Primary Examiner — Ryan Crockett
(74) Attorney, Agent, or Firm — F. Chau & Associates, LLC

(57) ABSTRACT

A liquid crystal display includes a pixel electrode disposed on an insulating substrate; a plurality of microcavities disposed over the pixel electrode; a plurality of liquid crystal injection holes connected to the plurality of microcavities that form a path through which a liquid crystal is injected; a common electrode that covers the microcavities; a partition wall structure that divides the plurality of liquid crystal injection holes; and a roof layer disposed over the common electrode that covers the common electrode and the microcavities, and comprises an organic material.

7 Claims, 9 Drawing Sheets

LIQUID CRYSTAL DISPLAY

CROSS-REFERENCE TO RELATED APPLICATION

This application claims priority under 35 U.S.C. 119 from Korean Patent Application No. 10-2013-0034892, filed in the Korean Intellectual Property Office on Mar. 29, 2013, and all the benefits accruing therefrom, the contents of which are herein incorporated by reference in their entirety.

BACKGROUND (a) Technical Field

Embodiments of the present disclosure are directed to a liquid crystal display, and more particularly, to a liquid crystal display having a liquid crystal layer present within a microcavity and a method of manufacturing the same.

(b) Discussion of the Related Art

A liquid crystal display is the most widely used flat panel display and includes two sheets of display panels provided with field generating electrodes, such as a pixel electrode and a common electrode, and a liquid crystal layer interposed therebetween.

An electric field is generated in the liquid crystal layer by applying voltage to the field generating electrode and an image is displayed by manipulating the alignment of liquid crystal molecules of the liquid crystal layer by controlling polarization of incident light based on the generated electric field.

A liquid crystal display with an embedded microcavity (EM) structure is an apparatus from which a display is manufactured by forming a sacrificial layer with a photo resist, coating a support member thereon, removing the sacrificial layer by an ashing process, and injecting the liquid crystal into an empty space, i.e. the microcavity, formed by removing the sacrificial layer.

The inlet through which liquid crystal material is injected into the microcavity is relatively narrow, and thus the liquid crystal material may overflow into another pixel side. As such, when the liquid crystal material overflows, the liquid crystal material may not be sufficiently filled into the current microcavity.

As a result, the corresponding microcavity may lack an appropriate cell gap for the liquid crystal layer and its corresponding pixel may be defective.

SUMMARY

Embodiments of the present disclosure can provide a liquid crystal display capable of appropriately dividing liquid crystal molecules when injecting the liquid crystal molecules while at the same time preventing the liquid crystal molecules from overflowing.

An exemplary embodiment of the present disclosure provides a liquid crystal display that includes: a pixel electrode disposed on an insulating substrate; a plurality of microcavities disposed over the pixel electrode; a plurality of liquid crystal injection holes connected to the plurality of microcavities that form a path through which a liquid crystal is injected; a common electrode that covers the microcavities; a partition wall structure that divides the plurality of liquid crystal injection holes; and a roof layer disposed over the common electrode that covers the common electrode and the microcavity, and includes an organic material.

The partition wall structure may include a partition wall part made of the same material as the roof layer.

The roof layer may include a pillar portion that is disposed between adjacent microcavities.

The partition wall part may be an extension of the pillar portion.

The liquid crystal display may further include a liquid crystal layer disposed within the microcavity and the liquid crystal injection hole; wherein the microcavities may have a matrix arrangement, the liquid crystal injection holes may cross the microcavities in a horizontal direction and may be divided by the partition wall structure.

The partition wall structure may be disposed in a straight line.

The partition wall structure may be disposed in a zigzag line.

Another exemplary embodiment of the present disclosure provides a liquid crystal display that includes: a pixel electrode disposed on an insulating substrate; a plurality of microcavities disposed over the pixel electrode; a plurality of liquid crystal injection holes connected to the plurality of microcavities that form a path through which a liquid crystal is injected; a partition wall structure that divides the plurality of liquid crystal injection holes; and a common electrode that covers the microcavities and is disposed under the partition wall structure, but is not disposed in the liquid crystal injection holes, wherein common electrodes adjacent to the liquid crystal injection hole are connected to each other by the common electrode under the partition wall structure.

The liquid crystal display may further include a roof layer disposed over the common electrode that covers the common electrode and the microcavity, and comprises an organic material. The partition wall structure may include a partition wall part made of the same material as the roof layer.

The roof layer may include a pillar portion disposed between adjacent microcavities.

The partition wall part may be an extension of the pillar portion.

The liquid crystal display may further include: a lower insulating layer disposed between the common electrode and the roof layer that may extend between the partition wall part and common electrode under the partition wall part.

The liquid crystal display may further include an upper insulating layer that covers the roof layer over the partition wall structure.

Another exemplary embodiment of the present disclosure provides a liquid crystal display that includes: a pixel electrode disposed on an insulating substrate; a thin film transistor disposed on the insulating substrate that is connected to the pixel electrode; a plurality of microcavities disposed over the pixel electrode; a plurality of liquid crystal injection holes disposed over the thin film transistor connected to the plurality of microcavities that form a path through which a liquid crystal is injected; a common electrode that covers the microcavities; and a partition wall structure disposed over the thin film transistor that divides the plurality of liquid crystal injection holes.

The partition wall structure may be lower than, equal to, or higher than a height of the microcavities.

The partition wall structure may include an opening.

Fewer than 29 pixels may be connected to one liquid crystal injection hole.

The liquid crystal display may further include a liquid crystal layer disposed within the microcavities and the liquid crystal injection holes. The microcavities may have a matrix arrangement, the liquid crystal injection holes disposed over the thin film transistors may cross the microcavities in a horizontal direction, and the liquid crystal injection holes may be divided by the partition wall structure.

The partition wall structure may be disposed on a straight line.

The partition wall structure may be disposed in a zigzag form.

As set forth above, according to exemplary embodiments of the present disclosure, the liquid crystal injection holes can be divided into at least two liquid crystal injection regions to prevent the liquid crystal molecules from leaking into another liquid crystal injection region prior to being injected into the microcavities, thereby ensuring that a sufficient amount of liquid crystal molecules are injected into the microcavities. Further, according to exemplary embodiments of the present disclosure, after the liquid crystal molecules are injected into the microcavities, the liquid crystal molecules can move between the liquid crystal injection regions to prevent the liquid crystal molecules from being partitioned into specific liquid crystal injection regions and microcavities, thereby reducing deterioration, such as hardening of the liquid crystal molecules, etc.

DETAILED DESCRIPTION OF EXEMPLARY EMBODIMENTS

Figure 1:
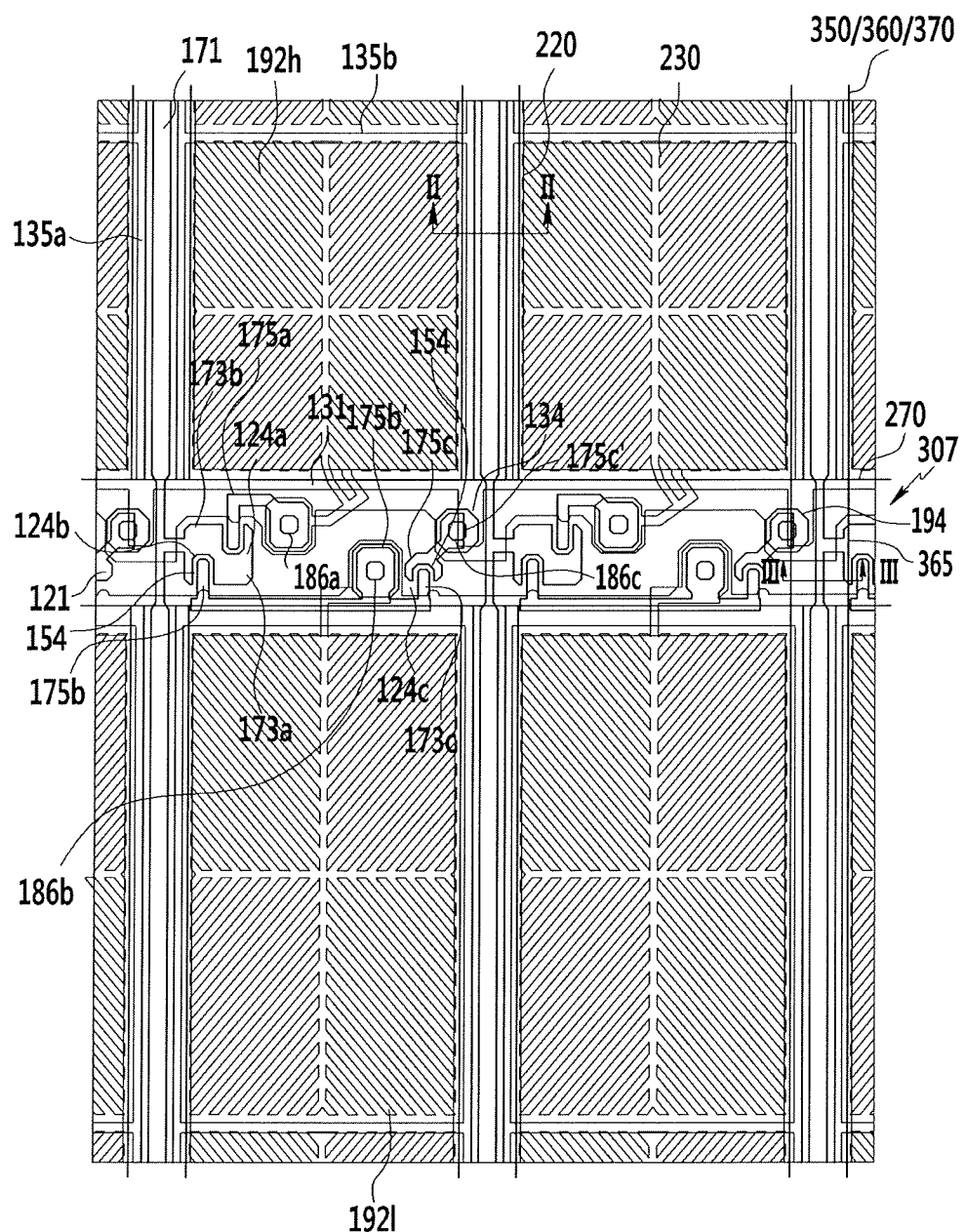
FIG. 1 is a plan view of a liquid crystal display according to an exemplary embodiment of the present disclosure.

Exemplary embodiments of the present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present.

Hereinafter, a liquid crystal display according to an exemplary embodiment of the present disclosure will be described in detail with reference to FIGS. 1 to 3.

Figure 2:
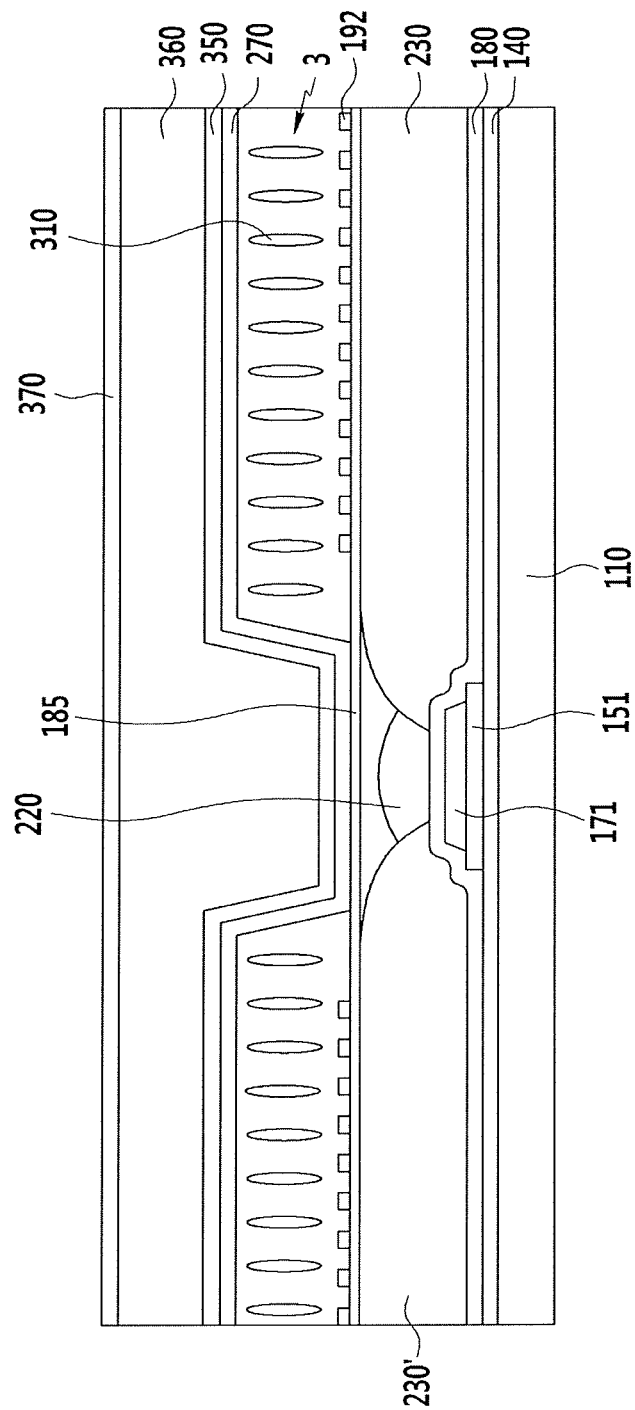
FIG. 2 is a cross-sectional view taken along the line II-II of FIG. 1.
Figure 3:
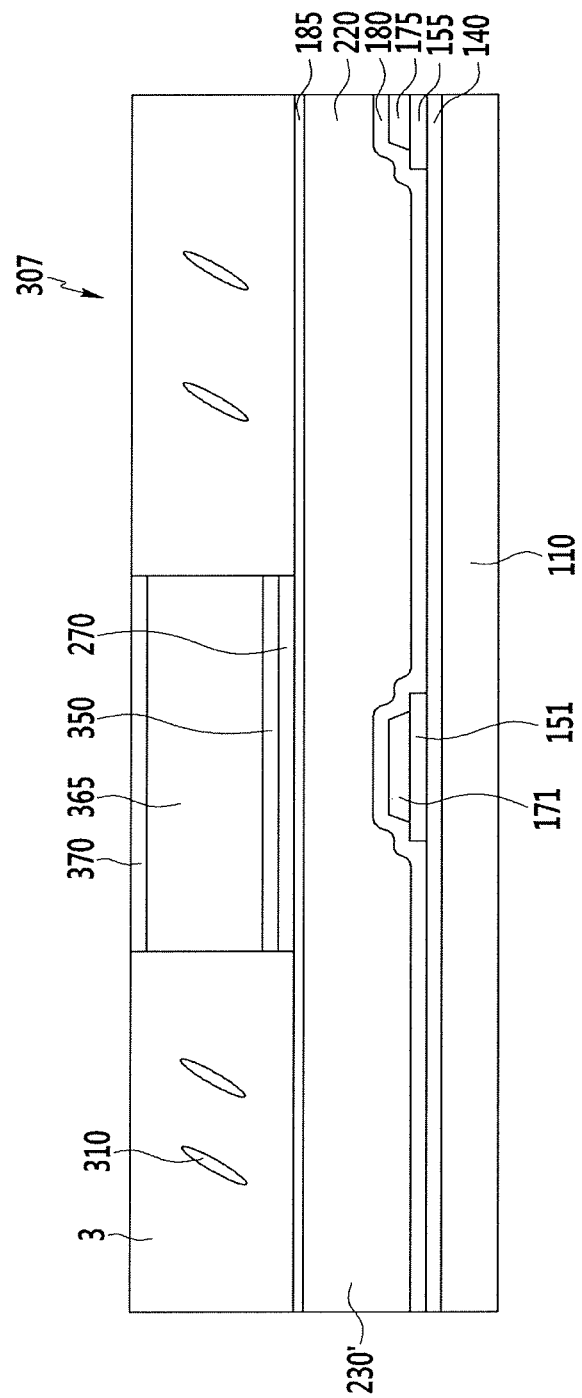
FIG. 3 is a cross-sectional view taken along the line III-III of FIG. 1.

FIG. 1 is a top plan view of a liquid crystal display according to an exemplary embodiment of the present disclosure, FIG. 2 is a cross-sectional view taken along the line II-II of FIG. 1, and FIG. 3 is a cross-sectional view taken along the line III-III of FIG. 1.

A gate line 121 and a sustaining voltage line 131 are formed on an insulating substrate 110 made of transparent glass, plastic, etc. The gate line 121 includes a first gate electrode 124a, a second gate electrode 124b, and a third gate electrode 124c. The sustaining voltage line 131 includes sustaining electrodes 135a and 135b and a protrusion 134 that protrudes in a direction of the gate line 121. The sustaining electrodes 135a and 135b have a structure that encloses a first sub-pixel electrode 192h and a second sub-pixel electrode 192l of an adjacent pixel. A horizontal part 135b of the sustaining electrode of FIG. 1 may be a wiring that is an integral part if the horizontal part 135b of an adjacent pixel.

A gate insulating layer 140 is formed over the gate line 121 and the sustaining voltage line 131. A semiconductor 151 disposed under a data line 171, a semiconductor 155 disposed under source/drain electrodes, and a semiconductor 154 disposed at a channel portion of a thin film transistor are formed on the gate insulating layer 140.

A plurality of ohmic contacts (not shown) may be formed over each semiconductor 151, 154, and 155 and between the data line 171 and the source/drain electrodes.

Data conductors 171, 173c, 175a, 175b, 175c that include a plurality of data lines 171, each of which further includes a first source electrode 173a and a second source electrode 173b, a first drain electrode 175a, a second drain electrode 175b, a third source electrode 173c and a third drain electrode 175c, are formed over each semiconductor 151, 154, and 155 and the gate insulating layer 140.

The first gate electrode 124a, the first source electrode 173a, and the first drain electrode 175a along with the semiconductor 154 form a first thin film transistor and a channel of the thin film transistor is formed in semiconductor 154 between the first source electrode 173a and the first drain electrode 175a. Similarly thereto, the second gate electrode 124b, the second source electrode 173b, and the second drain electrode 175b along with the semiconductor 154 form a second thin film transistor, the channel of the thin film transistor is formed in the semiconductor 154 between the second source electrode 173b and the second drain electrode 175b, the third gate electrode 124c, the third source electrode 173c, and the third drain electrode 175c along with the semiconductor 154 form a third thin film transistor, and the channel of the thin film transistor is formed in the semiconductor 154 between the third source electrode 173c and the third drain electrode 175c.

The data line 171 according to an exemplary embodiment of a present disclosure has a narrow width in a thin film transistor forming region near an extension 175c' of the third drain electrode 175c. The data line 171 is spaced apart from adjacent wirings by a predetermined distance to reduce signal interference.

A first passivation layer 180 is formed over the data conductors 171, 173c, 175a, 175b, and 175c and the exposed semiconductor 154. The first passivation layer 180 according to an exemplary embodiment of the present disclosure is made of an inorganic insulator, such as silicon nitride (SiNx), silicon oxide (SiOx), etc.

Color filters 230 are formed on the first passivation layer 180. Color filters 230 having the same color are formed at vertically adjacent pixels in a data line direction, and different color filters 230 and 230' may be provided to horizontally adjacent pixels in a gate line direction and two color filters 230 and 230' may be formed over the data line 171 and may also overlap each other. The color filters 230 and 230' may transmit a primary color, such as one of the three primary colors of red, green, and blue, etc. However, the color filters 230 and 230' may also transmit subtractive colors such as cyan, magenta, yellow, and white-based colors, without being limited to the three primary colors of red, green, and blue.

A black matrix 220 is formed over the color filters 230 and 230'

The black matrix 220 is formed of an opaque material. The black matrix 220 has a lattice structure having n openings that are provided with the color filter 230, a pixel electrode 192, and a liquid crystal layer 3.

A second passivation layer 185 is formed over the color filter 230 and the black matrix 220 to cover the color filter 230 and the black matrix 220. The second passivation layer 185 according to an exemplary embodiment of the present disclosure may be formed of an organic insulator to reduce or remove a step that may occur due to a thickness difference between the color filter 230 and the first black matrix 220.

The color filter 230, the black matrix 200, and the passivation layers 180 and 185 are provided with a first contact hole 186a and a second contact hole 186b that expose extensions 175b' of the first drain electrode 175a and the second drain electrode 175b. In addition, the color filter 230, the first black matrix 220, and the passivation layers 180 and 185 are provided with a third contact hole 186c that exposes the protrusion 134 of the sustaining voltage line 131 and the extension 175c' of the third drain electrode 175c.

According to an exemplary embodiment of the present disclosure, although the black matrix 220 and the color filter 230 are provided with the contact holes 186a, 186b, and 186c, etching the contact holes in the black matrix 220 and the color filter 230 may be more challenging than in the passivation layers 180 and 185, depending on the materials of the black matrix 220 and the color filter 230. Therefore, prior to the time of etching, the black matrix 220 or the color filter 230 may be removed from the positions where the contact holes 186a, 186b, and 186c are to be formed.

Alternatively, according to an exemplary embodiment of the present disclosure, a position of the black matrix 220 may be changed so that the color filter 230 and the passivation layers 180 and 185 may be etched to form the contact holes 186a, 186b, and 186c.

A pixel electrode 192 that includes a first sub-pixel electrode 192h and a second sub-pixel electrode 192l is formed on the second passivation layer 185. The pixel electrode 192 may be made of transparent conductive materials, such as ITO, IZO, etc.

The first sub-pixel electrode 192h and the second sub-pixel electrode 192l are vertically adjacent to each other in a column direction, have a rectangular shape, and each sub-pixel electrode includes a cruciform stem part formed of a horizontal stem part and a vertical stem part intersecting the horizontal stem part. Further, each sub-pixel electrode 192h and 192l is divided into four sub-regions by the cruciform stem part and each sub-region includes a plurality of fine branch parts.

The fine branch parts of the first and second sub-pixel electrodes 192h and 192l form an angle of about 40° to 45° with respect to the gate line 121 or the horizontal stem part. Further, the fine branch parts of two adjacent sub-regions may be orthogonal to each other.

The first and second sub-pixel electrodes 192h and 192l are physically and electrically connected to the first and second drain electrodes 175a and 175b, respectively, through the contact holes 186a and 186b and are supplied with a data voltage from the first and second drain electrodes 175a and 175b.

In addition, a connecting member 194 electrically connects the extension 175c' of the third drain electrode 175c to the protrusion 134 of the sustaining voltage line 131 through the third contact hole 186c As a result, some of the data voltage applied to the second drain electrode 175b is divided by the third source electrode 173c, such that a voltage magnitude applied to the second sub-pixel electrode 192l may be less than that applied to the first sub-pixel electrode 192h.

Herein, the area of the second sub-pixel electrode 192l may be one to two times greater than that of the first sub-pixel electrode 192h.

In addition, the second passivation layer 185 may be optionally provided with an opening that may collect gas discharged from the color filter 230 and a cover part that is formed over the opening from the same material as the pixel electrode 192 to cover the corresponding opening. The opening and the cover part can block the gas discharged from the color filter 230 from being transferred to another device.

The liquid crystal layer 3 is formed on the second passivation layer 185 and the pixel electrode 192. The space in which the liquid crystal layer 3 is disposed is referred to as a microcavity. The microcavity is supported by a roof layer 360 disposed in an upper portion of the microcavity.

An alignment layer (not shown) may be formed between the microcavity and the liquid crystal layer 3 to align the liquid crystal molecules 310. The alignment layer is a liquid crystal alignment layer made of polyamic acid, polysiloxane, polyimide, etc., and may include at least one generally used material.

The liquid crystal molecules 310 are initially aligned by the alignment layer and an alignment direction thereof changes depending on the applied electric field. A height of the liquid crystal layer 3 corresponds to that of the microcavity. According to an exemplary embodiment of the present disclosure, a thickness of the liquid crystal layer 3 may be from about 2.0 µm to about 3.6 µm.

A portion of the microcavity is punched and has liquid crystal injection holes 307. The liquid crystal injection holes 307 according to an exemplary embodiment of the present disclosure are disposed on an upper portion of the thin film transistor forming region in FIG. 1. The liquid crystal injection holes 307 are partially formed over the thin film transistor forming region, but not over the entire thin film transistor forming region. That is, the upper portion of the thin film transistor forming region is provided with partition wall structures to separate and divide the liquid crystal injection holes 307 left and right. The partition wall structure includes a plurality of layers, such as a partition wall part 365 that is an extension of the roof layer 360, a common electrode 270, a lower insulating layer 350, and an upper insulating layer 370, disposed over and under partition wall parts 365 of the roof layer 360. The layers disposed over and under the partition wall parts 365 may change according to an exemplary embodiment of the present disclosure. A height of the partition wall structure may be greater than or equal to that of the microcavity.

The liquid crystal layer 3 formed in the microcavity may be injected into the microcavity using capillary action in the liquid crystal injection holes 307 and the alignment layer may be also formed by capillary action. The upper portion of the thin film transistor forming region may also be provided with the liquid crystal layer 3.

The liquid crystal injection holes 307 may be sealed by a capping layer (not shown) after the alignment layer and the liquid crystal molecules 310 are injected. The capping layer may be also disposed over the partition wall structure.

The common electrode 270 is disposed over the microcavity and the liquid crystal layer 3. The common electrode 270 is bent along the microcavity over the data line 171, such that the common electrode 270 may be disposed closer to the data line 171. Further, no common electrode 270 is formed where the liquid crystal injection holes 307 are formed. However, the common electrode may be formed under the partition wall structure that divides the liquid crystal injection holes 307. In an exemplary embodiment of FIG. 1, the lower portion of the partition wall structure includes the common electrode 270, such that the common electrodes 270 may be vertically connected. That is, the common electrode 270 extends horizontally except at a portion where the liquid crystal injection holes 307 are formed, and the horizontally extending common electrodes 270 are vertically connected to the common electrode 270 under the partition wall structure. As a result, the common electrodes 270 for each pixel form a net structure, such that the common electrode 270 of a pixel disposed at a center of the display area may have a low voltage drop to have constant common voltage.

The common electrode 270 may be made of transparent conductive materials, such as ITO and IZO, and along with the pixel electrode 192 may generate an electric field to control the alignment direction of the liquid crystal molecules.

The lower insulating layer 350 is disposed over the common electrode 270. The lower insulating layer 350 according to an exemplary embodiment of the present disclosure may be made of inorganic insulating materials, such as silicon nitride (SiNx), etc. Like the common electrode 270, no lower insulating layer 350 is formed where the liquid crystal injection holes 307 are formed, and is formed under the partition wall structure that divides the liquid crystal injection holes 307. As a result, the horizontally extending lower insulating layers 350 are vertically connected to each other by the portion under the partition wall structure.

The roof layer 360 is formed on the lower insulating layer 350. The roof layer 360 according to an exemplary embodiment of the present disclosure is formed of an organic insulator. The roof layer 360 can support the pixel electrode 192 and the common electrode 270 so that a space (microcavity) may be formed between the pixel electrode 192 and the common electrode 270. To this end, the roof layer 360 is disposed between adjacent microcavities as well as over the microcavity, the common electrode and the lower insulating layer. The roof layer 360 disposed between the microcavities forms a pillar portion of the roof layer. Further, the roof layer 360 includes the partition wall parts 365 that extend onto the thin film transistor forming region in which the liquid crystal injection holes are disposed. The partition wall parts 365 are an extension of the pillar portion of the roof layer 360. The partition wall part 365 occupies most of the height in the partition wall structure that divides the liquid crystal injection holes 307. The height of the partition wall structure may correspond to or be greater than the height of the microcavity.

The upper insulating layer 370 is formed on the roof layer 360. The upper insulating layer 370 according to an exemplary embodiment of the present disclosure may be made of inorganic insulating materials, such as silicon nitride (SiNx). The upper insulating layer 370 is formed over the partition wall part 365 that divides the liquid crystal injection holes 307. As a result, the upper insulating layers 370 are horizontally connected to each other over the partition wall structure.

The lower insulating layer 350, the roof layer 360, and the upper insulating layer 370 have liquid crystal injection holes 307 punched therethrough to inject the liquid crystal into the microcavity in a region other than the partition wall structure. The liquid crystal injection holes 307 may be used even when a sacrificial layer (not shown) for forming the microcavity is removed. Further, the liquid crystal injection holes 307 are disposed over the thin film transistor forming region.

The microcavity layer may be formed by the following method. A sacrificial layer is formed in a shape of the microcavity layer and the common electrode 270, the lower insulating layer 350, the roof layer 360, and the upper insulating layer 370 are consecutively formed thereon. Next, the liquid crystal injection holes 307 that expose the sacrificial layer are formed by etching the common electrode 270, the lower insulating layer 350, the roof layer 360, and the upper insulating layer 370 and the exposed sacrificial layer is removed. Next, the liquid crystal layer is formed by injecting the liquid crystal molecules through the liquid crystal injection holes 307. In this case, no roof layer 360 is formed in the thin film transistor forming region, the lower insulating layer 350 and the upper insulating layer 370 may be stacked in the thin film transistor forming region in which the liquid crystal injection holes are disposed so that only the lower insulating layer 350 and the upper insulating layer 370 need be removed from the thin film transistor forming region to form the liquid crystal injection holes 307

According to an exemplary embodiment of the present disclosure, the roof layer 360, the upper insulating layer 370, and the lower insulating layer 350 may be etched together in the thin film transistor forming region to form the liquid crystal injection holes 307.

When the liquid crystal injection holes 307 are formed, the region formed with the partition wall structure is not etched. As a result, the partition wall structure configured of the common electrode 270, the lower insulating layer 350, the partition wall part 365, and the upper insulating layer 370 is completed. The liquid crystal injection holes 307 are divided by the partition wall structure and the position where the partition wall structure is formed may be present in various exemplary embodiments. The position of the partition wall structure will be described with reference to FIGS. 4 and 5.

The liquid crystal injection holes 307 may be sealed by a capping layer (not shown).

According to other exemplary embodiments of the present disclosure, the lower insulating layer 350 and the upper insulating layer 370 may be omitted.

Polarizers (not shown) are disposed under the insulating substrate 110 and on the upper insulating layer 370. The polarizers may include a polarization element and a tri-acetyl-cellulose (TAC) layer for durability. According to an exemplary embodiment of the present disclosure, the upper and lower polarizers have transmissive axes that may be perpendicular or parallel to each other.

Hereinafter, various positions of the partition wall structure will be described with reference to FIGS. 4 and 5.

Figure 4:
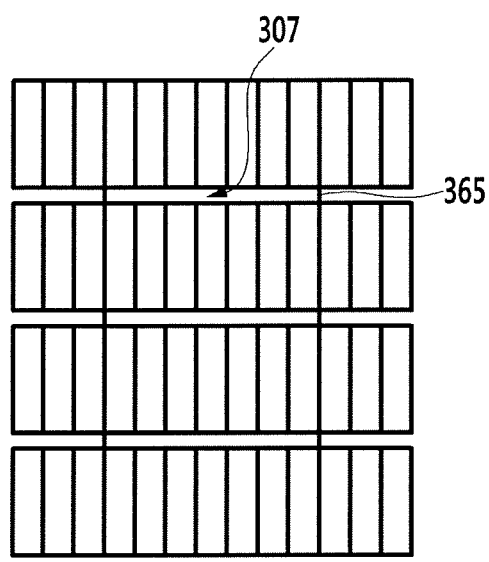
FIGS. 4 and 5 are schematic layout views of a liquid crystal display according to an exemplary embodiment of the present disclosure.
Figure 5:
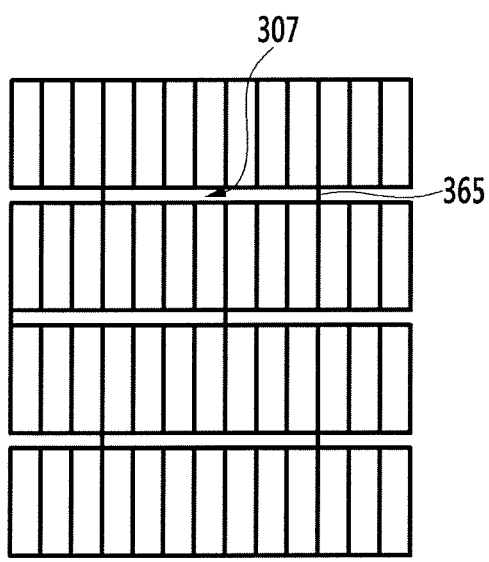

FIGS. 4 and 5 are schematic layout views of the liquid crystal display according to an exemplary embodiment of the present disclosure.

FIGS. 4 and 5 schematically illustrate an upper portion of the microcavity and the liquid crystal injection holes 307 and the partition wall structure that are disposed over the thin film transistor forming region. The main component of the partition wall structure is the partition wall part 365 and the remaining layers, such as the common electrode 270, the lower insulating layer 350, and the upper insulating layer 370, may be omitted.

The exemplary embodiment of FIGS. 4 and 5 shows the partition wall part 365 of the partition wall structure disposed every 7 pixels, but this number is exemplary and non-limiting. When the partition wall parts 365 are disposed too close to each other, the liquid crystal may be frequently dropped while being injected, and when the partition wall parts 365 are disposed too far away from each other, the number of microcavities for each liquid crystal injection hole 307 increases, and insufficient liquid crystal may be injected into these microcavities. The separation distance between partition wall parts 365 may be determined according to exemplary embodiments of the present disclosure. The separation distance will be described in detail with reference to FIGS. 10 and 13.

In the exemplary embodiment of FIG. 4, the partition wall parts 365 are disposed on a longitudinal extension line. However, in the exemplary embodiment of FIG. 5, the position of the partition wall parts 365 shifts so that the partition wall parts 365 take on a zigzag shape. In other embodiments, the partition wall parts 365 may be disposed at other positions.

That is, in a structure in which the microcavities form a matrix arrangement corresponding to the pixel arrangement, the liquid crystal injection holes 307 cross the microcavities in a horizontal direction. Further, the liquid crystal injection holes 307 are divided by the partition wall structure or partition wall part 365.

In the exemplary embodiment of FIG. 4, the partition wall structures or partition wall parts 365 that divide the liquid crystal injection holes in each row in the matrix structure are disposed on a straight line.

On the other hand, in the exemplary embodiment of FIG. 5, the partition wall structures or partition wall parts 365 that divide the liquid crystal injection holes in each row in the matrix structure are disposed in a zigzag line.

Hereinafter, various exemplary embodiments based on a section of one partition wall structure will be described with reference to FIGS. 6 to 8

Figure 6:
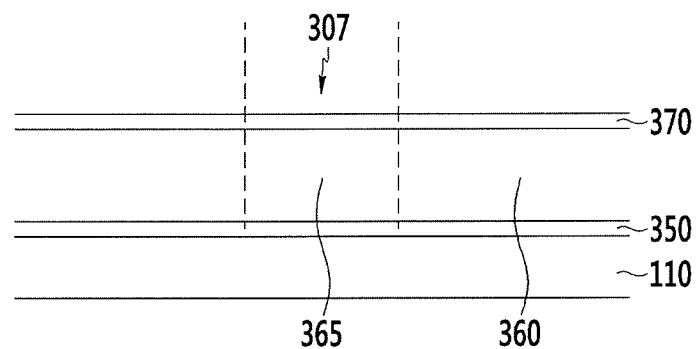
FIGS. 6 to 8 are cross-sectional views of partition walls of a liquid crystal display according to an exemplary embodiment of the present disclosure.
Figure 7:
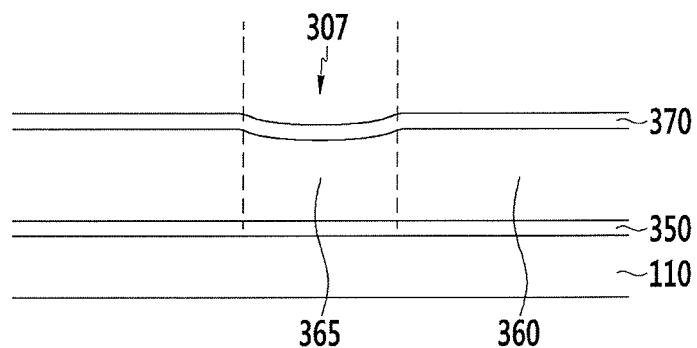
Figure 8:
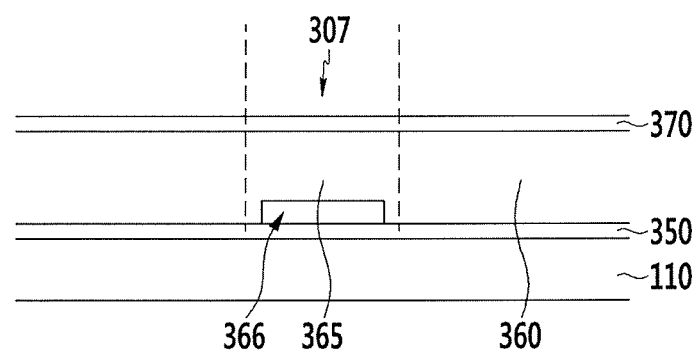

FIGS. 6 to 8 are cross-sectional views of the partition walls of a liquid crystal display according to an exemplary embodiment of the present disclosure.

FIGS. 6 to 8 are cross-sectional views in a direction vertical to the line III-III of FIG. 1 that illustrate a section between adjacent microcavities based on the partition wall structure.

First, the exemplary embodiment of FIG. 6 will be described.

In the exemplary embodiment of FIG. 6, the height of the partition wall structure coincides with the height between the microcavities. The height between the microcavities and the height over the microcavity are determined by the roof layer 360, such that the heights thereof may be the same. As a result, in an exemplary embodiment, the height of the partition wall structure is equal to that of the upper insulating layer 370 over the microcavity.

Alternatively, in the exemplary embodiment of FIG. 7, the height of the partition wall structure is lower than the height between the microcavities. The partition wall structure may have a height which is the same as or slightly less than that of the microcavity (i.e. liquid crystal layer). In this exemplary embodiment, at the time of injecting the liquid crystal, the liquid crystal may partially transfer to the adjacent liquid crystal injection holes 307, passing over the partition wall structure. However, even in an exemplary embodiment of FIG. 7, the liquid crystal does not transfer to another liquid crystal injection hole 307 by passing over the microcavity. Further, since the amount of transferred liquid crystal amount is small, the liquid crystal will sufficiently fill the microcavity.

The exemplary embodiment illustrated in FIG. 7 may be implemented by using a slit mask to control an exposure when the roof layer 360 and the partition wall part 365 are made of the organic materials, to lower the height of the partition wall 365. According to an exemplary embodiment of the present disclosure, the partition wall part 365 has a groove, such that the liquid crystal may move through the groove.

Alternatively, FIG. 8 illustrates an exemplary embodiment in which the height of the partition wall structure coincides with the height between the microcavities as illustrated in FIG. 6. However, the exemplary embodiment of FIG. 8 has an opening 366 formed under the partition wall structure to connect the adjacent liquid crystal injection holes 307 to each other through the opening 366. The opening 366 is disposed under the partition wall part 365. In this case, the liquid crystals may move through the opening 366. However, even in the exemplary embodiment of FIG. 8, the liquid crystal does not transfer to another liquid crystal injection hole 307 by passing over the microcavity. Further, since the amount of transferred liquid crystal amount is small, the liquid crystal will sufficiently fill the microcavity.

Hereinafter, a method for injecting the liquid crystal into the microcavity will be described with reference to FIG. 9.

Figure 9:
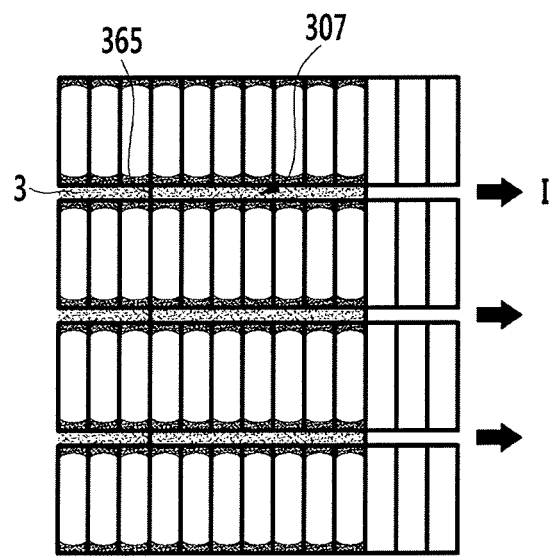
FIG. 9 is a diagram that illustrates a method for injecting liquid crystal molecules into a liquid crystal display according to an exemplary embodiment of the present disclosure.

FIG. 9 is a diagram that illustrates a method for injecting liquid crystal molecules into a liquid crystal display according to an exemplary embodiment of the present disclosure.

As illustrated in FIG. 9, the liquid crystal 3 drops into the liquid crystal injection hole 307. The liquid crystal injection holes 307 are separated from each other by the partition wall structure, such that an appropriate volume of liquid crystal 3 drops into one liquid crystal injection hole 307 while moving in an arrow I direction of FIG. 9.

The appropriate volume of liquid crystal 3 is greater than what is needed to form the liquid crystal layer in the microcavity, and the remaining volume partially forms the liquid crystal layer 3 in the liquid crystal injection holes 307 over the thin film transistor forming region, so that the liquid crystal injection hole 307 is completely filled without overflowing.

The liquid crystal dropping volume will be described with reference to FIG. 10.

Figure 10:
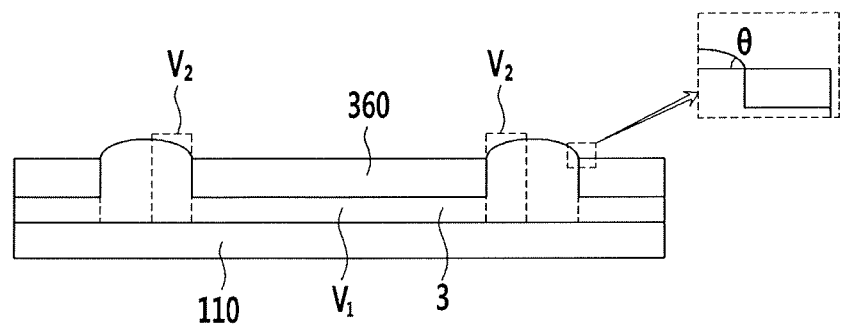
FIG. 10 is a diagram that illustrates calculating a dropping volume of a liquid crystal according to the exemplary embodiment of the present disclosure.

FIG. 10 is a diagram that illustrates calculating the liquid crystal dropping volume according to an exemplary embodiment of the present disclosure.

As illustrated in FIG. 10, V1 represents a liquid crystal volume formed in the microcavity and V2 represents the liquid crystal volume that may be injected into the liquid crystal injection hole 307. In this case, V2max represents a maximum liquid crystal volume that may be injected into the liquid crystal injection hole 307, which corresponds to a volume of the liquid crystal under the convex upward meniscus, without overflowing microcavity, as illustrated in FIG. 10

V1 is defined by the size of the microcavity and V2max is defined by the angle $\theta$ of the convex upward meniscus.

Further, letting Vdpp represent the liquid crystal dropping volume and Vvpp represent the volume of vapor included in the microcavity, the dropping volume satisfies the relationship expressed in Equation 1.

$$V1 + V2\text{max} < Vdpp + Vvpp \qquad \text{[Equation 1]}$$

The vapor volume increases with the first liquid crystal drops, but the vapor is discharged with the continued injection of the liquid crystal, reducing the vapor volume.

However, if the liquid crystal partially overflows early while being injected, some of the liquid crystal overflow might not be injected into the microcavity. The dropping volume is calculated in consideration of this phenomenon.

According to an exemplary embodiment of the present disclosure, the determination of a pixel separation distance between adjacent partition wall structures, given the overflow phenomenon described above, will be described with reference to FIGS. 11 to 13.

Figure 11:
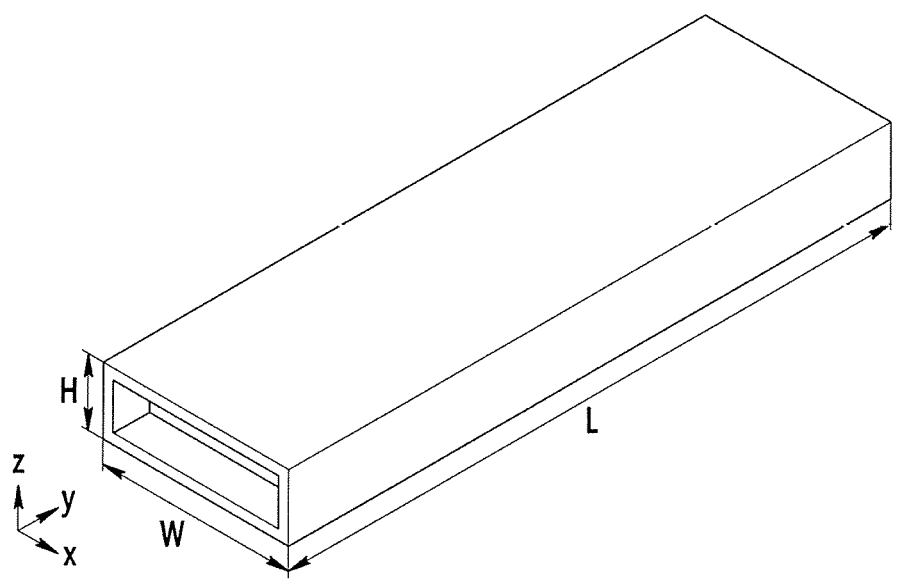
FIGS. 11 to 13 are diagrams that illustrate calculating a pixel separation distance between adjacent partition wall structures, according to an exemplary embodiment of the present disclosure.
Figure 12:
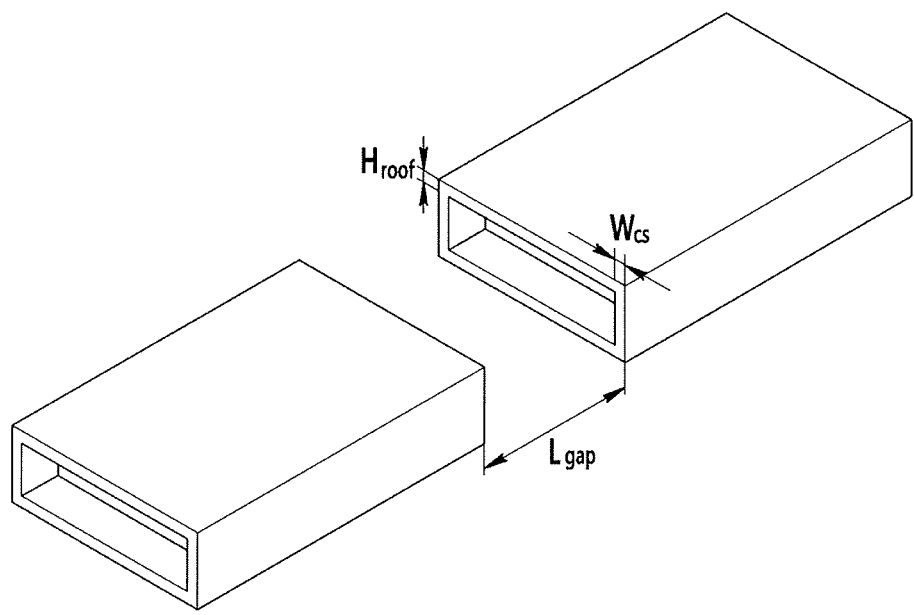
Figure 13:
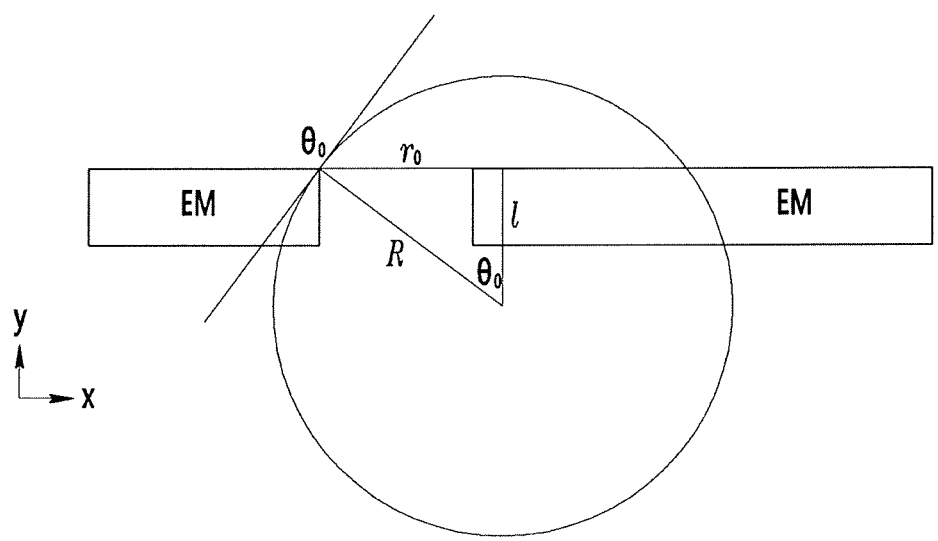

FIGS. 11 to 13 are diagrams for calculating a pixel separation distance between adjacent partition wall structures, according to an exemplary embodiment of the present disclosure.

As illustrated in FIG. 10, V1 represents the liquid crystal volume formed in the microcavity and V2 represents the liquid crystal volume that may be injected into the liquid crystal injection hole 307. In this case, V2 does not include a portion under the convex upward meniscus. Further, let V3 represent the liquid crystal volume that overflows the microcavity and flows toward the next partition wall structure.

In this case, the separation distance between partition wall structures is calculated so that overflowing liquid crystal covers less than half the distance toward the next partition wall structure.

First, the liquid crystal volume V1 formed in the microcavity is determined by Equation 2, with reference to FIG. 11.

$$V1 = W \cdot L \cdot H \quad \text{[Equation 2]}$$

In Equation 2, W represents the width of the microcavity, H represents the height of the microcavity, and L represents the length of the microcavity.

In addition, the liquid crystal volume V2 that may be injected into the liquid crystal injection hole 307 is determined by Equation 3, with reference to FIG. 12.

$$V2 = n \cdot (W + Wcs) L_{gap} \cdot (H + H_{roof}) \quad \text{[Equation 3]}$$

In Equation 3, n represents the number of pixels that are formed in one liquid crystal injection hole, Wcs represents the width between the microcavities, Lgap represents the length of the liquid crystal injection hole, and Hroof represents the thickness (or height) of the upper layer of the microcavity.

In addition, the liquid crystal volume V3 that overflows into the microcavity is determined by Equation 4, with reference to FIG. 13.

In FIG. 13, it is assumed that the shape of the overflowing liquid crystal may be represented by a circle and EM represents the microcavity.

In the structure illustrated in FIG. 13, r0 and l each depend on Equation 4.

$$r_0 = R \cdot \sin \theta_0$$

$$l = R \cdot \cos \theta \quad \text{[Equation 4]}$$

The V3 calculated based on Equation 4 depends on Equation 5.

$$\begin{aligned} V_3 &= \int_{R\cos\theta}^{R\cos 0} \pi r^2 \, dl = \int_{\theta}^{0} \pi R^3 (\sin\theta)^3 \, d\theta \quad \text{[Equation 5]} \\ &= -\pi R^3 \left[ \frac{1}{3}(\cos\theta)^3 - \cos\theta \right]_{\theta}^{0} \\ &= -\pi \left( \frac{r_0}{\sin\theta_0} \right)^3 \left[ \frac{1}{3}(\cos\theta)^3 - \cos\theta \right]_{\theta}^{0} \end{aligned}$$

A pixel separation value n may be obtained according to an exemplary embodiment of the present disclosure based on the values of V1, V2, and V3 as obtained above.

The n value according to an exemplary embodiment of the present disclosure may be calculated using the following values.

According to an exemplary embodiment of the present disclosure, a contacting angle θ is 50°, W is 93 μm, L is 265 μm, H is 3 μm, Wcs is 12 μm, Lgap is 50 μm, and Hroof is 4.3 μm.

When V1, V2, and V3 are calculated based on the above parameter values, V1, V2, and V3 may be expressed by Equations 6 to 8.

$$V_1 = n \cdot W \cdot L \cdot H = x \times 93 \times 265 \times 3 = 73953n \quad \text{[Equation 6]}$$

$$\begin{aligned} V_2 &= n \cdot (W + W_{CS}) \cdot L_{gap} \cdot (H + H_{roof}) \quad \text{[Equation 7]} \\ &= n \times (92 + 12) \times 50 \times (3 + 4.3) = 35 \end{aligned}$$

$$\begin{aligned} V_3 &= -\pi \left( \frac{r_0}{\sin\theta_0} \right)^3 \left[ \frac{1}{3}(\cos\theta)^3 - \cos\theta \right]_{\theta}^{0} \quad \text{[Equation 8]} \\ &= -\pi \left( \frac{92.5}{\sin 50} \right)^3 \left[ \frac{1}{3}(\cos 0)^3 - \cos 0 \right] + \\ &\quad \pi \left( \frac{92.5}{\sin 50} \right)^3 \left[ \frac{1}{3}(\cos 50)^3 - \cos 50 \right] \\ &= 1052365. \end{aligned}$$

In the above Equations, V3 corresponds to half the distance between the adjacent liquid crystal injection holes.

When the liquid crystal injection starts, the liquid crystal to be injected into the microcavity is disposed in the liquid crystal injection hole and is not immediately injected into the microcavity by the vapor. Therefore, when the amount to be injected into the microcavity actually drops into the microcavity, the amount remaining after the liquid crystal is disposed in the liquid crystal injection hole is V3.

Therefore, the relationship between V1, V2, and V3 may be expressed by Equation 9.

$$V3 = V1 - V2 \quad \text{[Equation 9]}$$

The n value calculated from Equation 9 becomes 29.6. Therefore, when fewer than 29 pixels are connected to one liquid crystal injection hole, the liquid crystal does not overflow into another liquid crystal injection hole.

The above calculation is based on parameter values of a specific exemplary embodiment of the present disclosure and the number of pixels grouped into one liquid crystal injection hole may change according to parameter values of other exemplary embodiments of the present disclosure.

While this disclosure has been described with respect to what are presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal display, comprising:
   a pixel electrode disposed on an insulating substrate;
   a plurality of microcavities disposed over the pixel electrode;
   a plurality of liquid crystal injection holes connected to the plurality of microcavities that form a path through which a liquid crystal is injected;
   a common electrode that covers the microcavities;
   a partition wall structure that divides the plurality of liquid crystal injection holes; and
   a roof layer disposed over the common electrode that covers the common electrode and the microcavities, and comprises an organic material.

2. The liquid crystal display of claim 1, wherein the partition wall structure comprises a partition wall part made of the same material as the roof layer.

3. The liquid crystal display of claim 2, wherein:
the roof layer comprises a pillar portion that is disposed between adjacent microcavities.

4. The liquid crystal display of claim 3, wherein:
the partition wall part is an extension of the pillar portion.

5. The liquid crystal display of claim 1, further comprising:
a liquid crystal layer disposed within the microcavity and the liquid crystal injection hole;
wherein the microcavities have a matrix arrangement, the liquid crystal injection holes cross the microcavities in a horizontal direction and are divided by the partition wall structure.

6. The liquid crystal display of claim 5, wherein:
the partition wall structure is disposed in a straight line.

7. The liquid crystal display of claim 5, wherein:
the partition wall structure is disposed in a zigzag line.

* * * * *